Feb. 19, 1963 J. K. MILLS 3,078,422

TRANSISTOR OSCILLATOR EMPLOYING CURRENT AND VOLTAGE FEEDBACK

Filed Dec. 9, 1960 2 Sheets-Sheet 1

INVENTOR
J. K. MILLS
BY V. P. Priolo
ATTORNEY

TRANSISTOR OSCILLATOR EMPLOYING CURRENT AND VOLTAGE FEEDBACK

Filed Dec. 9, 1960 2 Sheets-Sheet 2

INVENTOR
J. K. MILLS
BY V. P. Piolo
ATTORNEY

United States Patent Office 3,078,422

Patented Feb. 19, 1963

3,078,422
TRANSISTOR OSCILLATOR EMPLOYING CURRENT AND VOLTAGE FEEDBACK

John K. Mills, Morristown, N.J., assignor to Bell Telephone Laboratories, Incorporated, New York, N.Y., a corporation of New York Filed Dec. 9, 1960, Ser. No. 74,804
36 Claims. (Cl. 331—113)

This invention relates to power supply systems and, more particularly, to a system for converting direct current to alternating current which, in turn, may be rectified.

In many electrical and electronic systems ranging in scope from high fidelity audio to guided missiles it is important to employ power systems which employ direct current and supply it at a constant magnitude to a given load. Such power supply systems must possess an extremely high degree of reliability with a relatively high order of absolute current stabilization. Power supply systems of the transistor core converter type which are small, light, efficient and require no maintenance possess the required degree of reliability and stability and, therefore, qualify for broad applications.

A converter circuit generally employs a plurality of transistors and a saturable transformer for converting direct current to alternating current which, in turn, may be rectified. The transistors function as automatic switches, i.e., conductive or nonconductive, to complete circuits for supplying current from a direct-current source to a portion of a transformer winding alternately in opposite directions. Each circuit is usually completed through one or more transistor switches in series with the direct-current supply source with either current or voltage feedback employed to control the switching time of the transistors.

In voltage feedback configurations employing saturable transformer switching control, the circuit will fail to start or will stop under low temperature or overload conditions. Circuits which will overcome these conditions are inherently poor in efficiency. In addition, the saturable transformer (1) is expensive to construct, (2) has high core losses, (3) introduces noise, and (4) results in high current spikes in transistor-collector current when the transistor is switching both "on" and "off." A further objection to core saturation circuits is that frequency is a function of both the source voltage and the saturation flux density of the core which is temperature sensitive. The advantages of voltage feedback configurations are: (1) the circuit will oscillate at no load, and (2) the circuit rather than the load maintains control of the frequency of oscillation.

A current feedback configuration employing saturable transformer (which may be either a main or a feedback transformer) switching control overcomes some of the objectionable voltage feedback features at the cost of additional other objectionable features. Current feedback circuits with a saturable main transformer start easily and carry heavy loads since the transistor drive is proportional to the load current which also results in automatic compensation for temperature caused and random base-emitter voltage variations. Current spikes are reduced considerably but not eliminated. Unfortunately, these circuits still fail at no load, suffer the same frequency control problems as with voltage feedback and both core losses and acoustic noise remain high.

Current feedback circuits with a saturable feedback transformer have a very unstable frequency characteristic which varies with load, temperature and transistor selection. Such circuits would also stop oscillating at no load and, therefore, do not appear to be practicable for most applications.

The prior art has also taught converter configurations wherein switching action is achieved by transistor saturation rather than transformer saturation. These circuits, however, have relatively longer switching times because of the storage time required for the consumption of the excess minority carriers in the transistor. A related disadvantage is the spike of excess current through each of the transistors due to simultaneous conduction through the transistors during the turning-on and turning-off intervals of the transistors.

It is therefore an object of this invention to provide a converter in which the frequency of oscillation is independent of both transformer and transistor saturation.

It is another object of this invention to provide a converter which provides both current and voltage feedback, thus obtaining the advantages of both and eliminating some of the individual disadvantages.

Another object of this invention is to provide a converter with reduced transistor switching time.

Another object of this invention is to provide a converter with a frequency output substantially independent of input voltage variations, load variations and temperature variations.

Another object of this invention is to provide a converter wherein the noise is reduced to a nominal value.

It has been found that these objects may be achieved by employing an inductor, which controls the transistor switching intervals, in combination with a resistor in a closed voltage and current feedback loop.

A feature of this invention resides in the combination of current and voltage feedback by employing a resistive path to feed back a portion of the voltage induced in the secondary winding of the main transformer to the feedback transformer.

Another feature of this invention resides in the use of an inductor shunted across the feedback transformer to control transistor switching times.

Other objects and features of the present invention will become apparent upon consideration of the following detailed description when taken in connection with the accompanying drawings in which.

Figure 1:
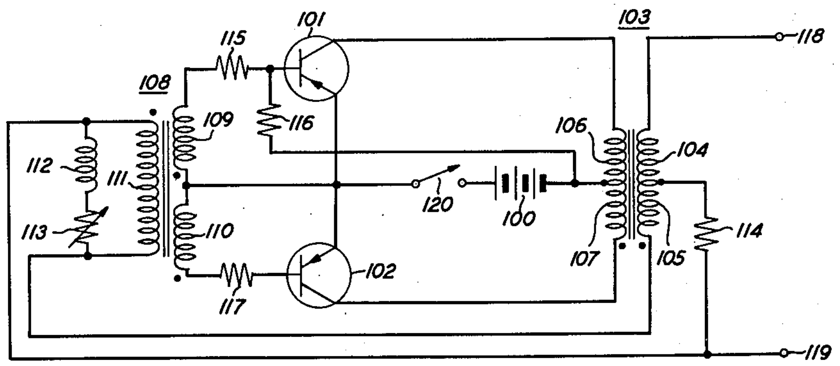
FIG. 1 is a schematic representation of an electrical circuit comprising a common emitter embodiment of the invention.

Referring now to FIG. 1 of the drawing there is provided a direct-current supply source 100, p-n-p transistors 101 and 102, a transformer 103 with winding portions 104, 105, 106 and 107, another transformer 108 with windings or winding portions 109, 110 and 111, an inductor 112 and resistors 113, 114, 115, 116 and 117. Terminals 118 and 119 are output terminals.

The emitter terminals of transistors 101 and 102 are tied to one terminal of the input direct-current supply source 100 by switch 120. The other terminal of the input direct-current supply source 100 is connected to the common terminal of winding portions 106 and 107. The other terminal of winding portion 106 is connected to the collector electrode of transistor 101 while the other terminal of winding portion 107 is connected to the collector of transistor 102. The emitter electrodes of transistors 101 and 102 are connected to the common terminal of windings 109 and 110. The base electrode of transistor 101 is serially connected to the base electrode of transistor 102 by resistors 115 and 117 and windings 109 and 110.

Resistor 116 connects the base electrode of transistor 101 and the common terminal of winding portions 106 and 107. Output terminal 118 is serially connected to output terminal 119 by winding portions 104, 105 and winding 111. Inductor 112 and the adjustable resistor 113 are connected across winding 111. Resistor 114 connects the common terminal of winding portions 104 and 105 to the output terminal 119.

Although the configuration uses only the p-n-p transistors, it should be understood that n-p-n transistors could be used equally as effectively.

At the time switch 120 is closed current will flow from the direct-current supply source 100 through the emitter-base electrodes of transistor 101 through resistor 116 and back to the direct-current supply source 100. Transistor 101 is thus biased into conduction and current also flows from the direct-current supply source 100 through the collector-emitter electrodes of transistor 101 through winding portion 106 and back to the direct-current supply source 100. Tracing the induced voltages with the aid of the dot convention, it is seen that output terminal 118 is positive with respect to output terminal 119. Current will flow through the load connected to terminals 118 and 119 and through winding portions 104 and 105 and winding 111 which, in turn, as seen by the dot convention drives transistor 101 further into conduction and transistor 102 further into cutoff. Since transistor 101 is driven further into conduction more emitter-collector current flows, more voltage is induced in winding portions 104 and 105 and the base-emitter junction of transistor 101 is biased further into conduction. It should be noted that current also flows through inductor 112 and the adjustable resistor 113 as well as through resistor 114. Initially, (i.e., at the time transistor 101 is biased into conduction and transistor 102 is biased into cutoff) most of the current in the branch comprising inductor 112, resistor 113 and winding 111 flows through transformer winding 111 which to a first approximation appears in the branch as a resistor whose impedance comprises the reflected secondary loads which are the base-to-emitter impedance of the transistors together with their series equalizing resistors as modified by the square-turn ratio of the windings. As time passes, the current in inductor 112 rises, most of the current eventually passing through the inductor 112, thus "starving" the transformer winding 111 and reducing the transistor biasing voltages to values insufficient to maintain saturation of the "on" transistor. This, in turn, leads to reduction in current in the collector-emitter and load path of the "on" transistor due to the increased collector-to-emitter impedance. Less load path current results in less induced current in the winding 111 and inductor 112. The inductor 112, however, inherently opposes any sudden current change in the load feedback circuit. When the current through inductor 112 starts to decrease, the induced electromotive force in the inductor reverses and induces a current in the reverse direction which, in turn, discharges through feedback transformer winding 111. Thus, when the load current drops to a magnitude below the inductor current, the feedback transformer winding 111 current must reverse in direction.

The inverse current in the transformer winding 111 causes the "on" transistor to be biased off and the "off" transistor to be biased on. Current now flows from the input direct-current supply source 100 through winding portion 107 through the emitter-collector electrodes of transistor 102 and back to the input direct-current supply source 100. The voltage now induced in the secondary winding comprising winding portions 104 and 105 of transformer 103 is now of opposite polarity to the previously induced voltage and a new half cycle of oscillation is begun. The process now repeats itself until transistor 101 is again biased on and transistor 102 is biased off. The cycle then again repeats itself continually until switch 120 is opened. It is readily seen that the frequency of the converter is controlled by the time constant of the branch comprising inductor 112 and adjustable resistor 113.

Since the transistors are not in saturation when biased off, the storage time required with other types of circuits for consumption of the excess minority carriers is not necessary. As a result, the transistors switch more rapidly. There is a related advantage in that there is no spike of excess current through the transistors, since the simultaneous conduction during the "turning-on" and "turning-off" periods, does not occur as in conventional circuits.

Without resistor 114 the converter shown in FIG. 1 will not oscillate at no load and its frequency will vary with load, temperature and transistor parameter variations. To overcome these undesirable features resistor 114 is added. Since current is always available to the feedback transformer 108 and the shunt path comprising shunt inductor 112 and adjustable resistor 113, even at no load, the frequency is stabilized. For a steady load the circuit efficiency is highest without resistor 114; hence, the use of resistor 114 is to be preferred principally for variable loads and for a constant load only where frequency stability is important.

It should be understood that in the circuit of FIG. 1 the frequency controlling adjustable resistor 113 may be eliminated and the inductor 112 incorporated as an air gap in the magnetic circuit of transformer 108. The air gap produces the equivalent of a shunt inductance 112 of the desired value. Alternately, the shunt inductor 112 may be placed across any winding or portion thereof of the feedback transformer 108.

Figure 2:
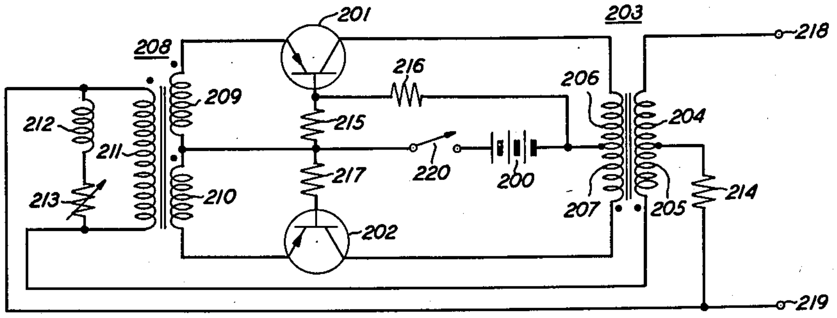
FIGS. 2 and 3 are schematic representations of electrical circuits comprising common base and common collector embodiments, respectively, of the invention.
Figure 3:
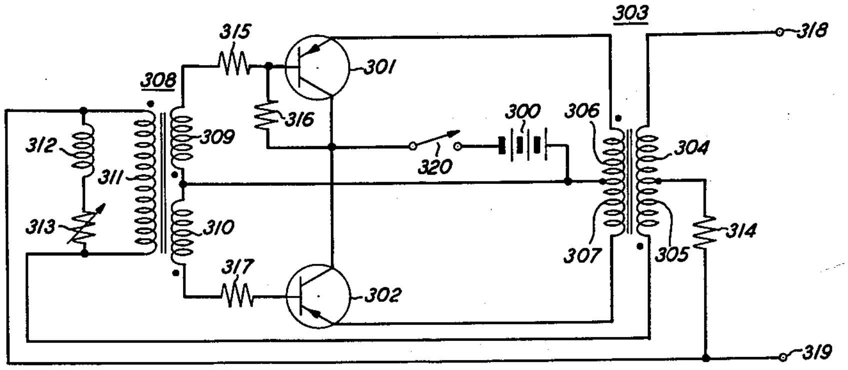

FIGS. 2 and 3 are second and third embodiments of the invention wherein transistors are connected in the common base and common collector configurations, respectively. The designation numerals of FIGS. 2 and 3 are identical to those of FIG. 1 except that the first digit has been changed to correspond to the figure number. Because the circuit of FIGS. 2 and 3 function in the same manner as the circuit in FIG. 1 they are not discussed further.

Figure 4:
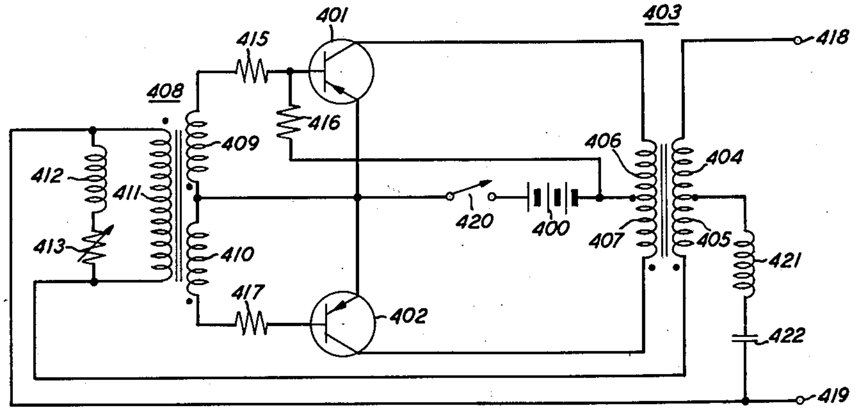
FIG. 4 is a schematic representation of an electrical circuit comprising an alternate embodiment of the preferred embodiment of FIG. 1.

The structure of FIG. 4 is also basically the embodiment of the structure of FIG. 1 wherein the tuned circuit comprising inductor 421 and capacitor 422 is substituted for resistor 114. The designation numerals of FIG. 4 are identical to those of FIG. 1 except that the first digit has been changed to correspond to the figure number. The circuit of FIG. 4 functions in the same manner as the circuit of FIG. 1, hence, it is not discussed further. The tuned circuit path comprising inductor 421 and capacitor 422 provides feedback current to the shunt path comprising feedback transformer winding 411, inductor 412 and adjustable resistor 413 and is effective principally at the resonant frequency of the over-all circuit. The frequency stabilization achieved in this manner is superior to the stabilization achieved in the structure of FIG. 1 wherein resistor 114 is employed in the same manner for the same function.

Figure 5:
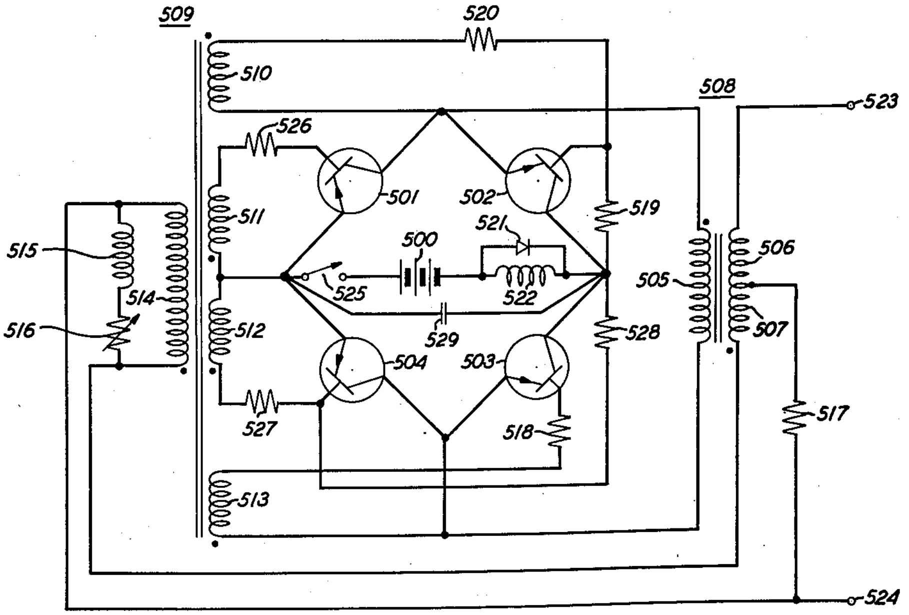
FIG. 5 is a schematic representation of an electrical circuit comprising a greater power output embodiment of the invention.

Concepts of the invention disclosed in FIGS 1–4 may also be applied to bridge converter circuits. One such of many possible embodiments is shown in FIG. 5. In the circuit of FIG. 5 the emitter electrodes of transistors 501 and 504 are connected to one terminal of the input direct-current supply source 500 by single-pole single-throw switch 525. The other terminal of the input direct-current supply source 500 is connected to the collector electrode of transistors 502 and 503 by the shunt combination comprising inductor 522 and asymmetrically conducting device 521. Capacitor 529 is connected across switch 525, input direct-current source 500 and inductor 522. The base electrode of transistor 501 is serially connected to the emitter electrode of transistor 501 by resistor 526 and winding 511. The base electrode of transistor 504 is serially connected to the emitter electrode of transistor 504 by resistors 527 and winding 512. The collector eletcrode of transistor 501 and the emitter electrode of transistor 502 are connected to one terminal of winding 510. The other terminal of winding 510 is connected to the base electrode of transistor 502 by resistor 520. The collector electrode of transistor 504 and the emitter electrode of transistor 503 are connected to one terminal of winding 513. The other terminal of winding 513 is connected to the base electrode of transistor 503 by resistor 518. The base electrode of transistor 504 is connected to the collector electrodes of transistors 502 and 503 by resistor 528. The base electrode of transistor 502 is connected to the collector electrodes of transistors 502 and 503 by resistor 519. The emitter electrode of transistor 502 and the emitter electrode of transistor 503 are connected by winding 505. Output terminal 523 is serially connected to output terminal 524 by winding portions 506 and 507 and winding 514. Inductor 515 and resistor 516 are serially connected across winding 514. The common terminal of winding portions 506 and 507 is connected to output terminal 524 by resistor 517.

The operation of the configuration of FIG. 5 is as follows: When the switch 525 is closed, current will flow from the direct-current supply source 500 through the emitter-base path of transistor 504, through resistor 528, through inductor 522 and back to the direct-current supply source 500. Transistor 504 is thus biased into conduction, current will now flow from direct-current supply source 500 through the collector-emitter path of transistor 504, through transformer winding 505 through the base-emitter path of transistor 502, through the resistor 519, through the inductor 522 and back to the direct-current supply source 500. Transistor 502 is thus biased into conduction. Current now flows from direct-current supply source 500 through the emitter-collector electrodes of transistor 504 through winding 505 through the emitter-collector electrodes of transistor 502 and through inductor 522 back to the direct-current supply source 500. Tracing the induced voltages with the aid of the dot convention, it is seen that output terminal 523 is positive with respect to output terminal 524. Current will now flow through the load connected to terminals 523 and 524 and through winding portions 506 and 507 and winding 514 which, in turn, as seen by the dot convention, drives transistors 502 and 504 further into conduction and transistors 501 and 503 further into cutoff. Since transistors 502 and 504 are driven further into conduction more collector-emitter current flows, more voltage is induced, winding portions 506 and 507 and the base-emitter junctions of transistors 502 and 504 are biased further into conduction. It should be noted that current also flows through inductor 515 and adjustable resistor 516 and also through resistor 571. Initially (i.e., at the time transistors 502 and 504 are biased into conduction and transistors 501 and 503 biased into cutoff) most of the current flows through the transformer winding 514 which to a first approximation appears in the branch as a resistor whose impedance comprises the reflected secondary loads which are the base-to-emitter impedances of the transistors together with their series equalizing resistors as modified by the squared-turns ratios of the windings. As time passes, the current in inductor 515 rises, most of the current eventually passing through the inductor 515 thus "starving" the transformer winding 514 and reducing the transistor biasing voltages to values insufficient to maintain saturation of the "on" transistors. This, in turn, leads to a reduction in current in the collector-emitter and load paths of the "on" transistors due to the increased collector-emitter impedance. Less load path current results in less induced current in the winding 514 and inductor 515. The inductor 515, however, inherently opposes any sudden current change in the load feedback circuit. When the current through inductor 515 starts to decrease, the induced E.M.F. in the inductor reverses and induces a current in the reverse direction which, in turn, discharges through feedback transformer winding 514. Thus, when the load current drops in magnitude below the inductor current, the feedback transformer winding 514 current must reverse in direction. The inverse current in the transformer winding 514 causes the "on" transistors to be biased off and the "off" transistors to be biased on. Current flows from the input direct-current supply source 500 through the collector-emitter path of transistor 501 through winding 505 through the collector-emitter path of transistor 503 through inductor 522 and back to the direct-current supply source 500. The voltage induced in the secondary winding comprising winding portions 506 and 507 of transformer 508 is now of opposite polarity to the previously induced voltage and a new half cycle of oscillation is begun. The process now repeats itself until transistors 502 and 504 are again biased into conduction and transistors 501 and 503 are again biased into cutoff. The cycle then again repeats itself continually until switch 525 is opened. It is readily seen that the frequency of the converter is controlled by the time constant of the branch comprising inductor 515 and the adjustable resistor 516.

Asymmetrically conducting device 521 in combination with inductor 522 prevents destructive voltage overshoot on starting. Without asymmetrically conductive device 521 there would be a damped oscillation with a peak voltage greatly in excess of the source voltage 500 when the latter is applied which, in turn, may cause transistor failure. Asymmetrically conducting device 521 clamps the overshoot to approximately the input source voltage. In normal operation, after the starting surge is over, the peak ripple voltage across inductor 522 is small in comparison to the threshold value of asymmetrically conducting device 521. At this said small ripple voltage the asymmetrically conducting device presents a relatively high impedance and does not prevent normal filtering of the input current by inductor 522. Capacitor 529 is a filter capacitor.

It should be noted that combinations of n-p-n and p-n-p transistors other than those shown could be used equally as effectively in each of the embodiments of FIGS. 1 through 5.

Since changes may be made in the above-described arrangement and different embodiments may be devised by those skilled in the art without departing from the spirit and scope of the invention, it is to be understood that the matter contained in the foregoing description and accompanying drawings is illustrative of the application of the principles of the invention and is not to be construed in a limiting sense.

What is claimed is:

1. In a transistor oscillator, a transistor, input and output circuits for said transistor, frequency control means connected across said input circuit, a load connected in said output circuit, current feedback means serially connecting said load, said input circuit and said output circuit, voltage feedback means connecting said load across at least a portion of said input and output circuits whereby voltage and current feedback energy is transmitted from said load to said transistor.

2. A transistor oscillator in accordance with claim 1 wherein said voltage feedback means comprises a resonant circuit.

3. A converter circuit comprising a pair of transistors each having base, collector and emitter electrodes, first and second transformers each having a plurality of windings, means for connecting a first common electrode of each of said transistors, means for connecting a second common electrode of each of said transistors, said means comprising one of said plurality of windings of said first transformer, an input direct-current source, means for connecting the third common electrode of each of said transistors to the one of said plurality of windings of said first transformer, said means comprising said direct-current input source, means for connecting the one electrode of said first common electrodes and the one electrode of said third comon electrodes of each of said transistors, said means comprising an individual one of said plurality of windings of said second transformer, a load, means for serially connecting another of said plurality of windings of said first transformer, said load and another of said plurality of windings of said second transformer, and voltage feedback means connecting a portion of said other winding of said first transformer to said load.

4. A converter circuit in accordance with claim 3 wherein said voltage feedback means comprises a resistor.

5. A converter circuit in accordance with claim 3 wherein said voltage feedback means comprises a resonant circuit.

6. A converter circuit having a pair of transistors each having base, collector and emitter electrodes, first and second transformers each having a plurality of windings, means for connecting the base electrodes of said transistors, means for connecting the collector electrodes of said transistors, said means comprising one of said plurality of windings of said first transformer, an input direct-current source, means for connecting the base electrodes of said transistors to the said one of said plurality of windings of said first transformer, said means comprising said direct-current source, means for connecting the base and emitter electrodes of each of said transistors, said means comprising an individual one of said plurality of windings of said second transformer, a load, means for serially connecting another of said plurality of windings of said first transformer, said load and another of said plurality of windings of said second transformer, voltage feedback means, said voltage feedback means connecting a portion of said other winding of said first transformer to said load.

7. A converter circuit having a pair of transistors each having base, collector and emitter electrodes, first and second transformers each having a plurality of windings, means for connecting the collector electrodes of said transistors, means for connecting the emitter electrodes of said transistors, said means comprising one of said plurality of windings of said first transformer, an input direct-current source, means for connecting the collector electrodes of said transistors to the one of said plurality of windings of said first transformer, said means comprising said direct-current source, means for connecting the base and emitter electrodes of said transistors, said means comprising an individual one of said plurality of windings of said second transformer and a separate portion of the said one winding of said first transformer, a load, means for serially connecting another of said plurality of windings of said first transformer, said load, and another of said plurality of windings of said second transformer, voltage feedback means, said voltage feedback means connecting a portion of said other winding of said first transformer to said load.

8. A converter circuit comprising a pair of transistors each having base, collector and emiter electrodes, first and second transformers each having a plurality of windings, means for connecting a first common electrode of said transistors, means for connecting a second common electrode of said transistors, said means comprising one of said plurality of windings of said first transformer, an input direct-current source, means for connecting the third common electrode of said transistors to the one of said plurality of windings of said first transformer, said means comprising said direct-current input source, means for connecting the one electrode of said first common electrodes and the one electrode of said third common electrodes of each of said transistors, said means comprising an individual one of said plurality of windings of said second transformer, a load, means for serially connecting another of said plurality of windings of said first transformer, said load and another of said plurality of windings of said second transformer, voltage feedback means, said voltage feedback means connecting a portion of said other winding of said first transformer to said load, frequency control means including an equivalent inductance, means for connecting said frequency control means across the said other winding of said second transformer.

9. A converter circuit in accordance with claim 8 wherein said voltage feedback means comprises a resistor.

10. A converter circuit in accordance with claim 8 wherein said voltage feedback means comprises a resonant circuit.

11. A converter circuit having a pair of transistors each having base, collector and emitter electrodes, first and second transformers each having a plurality of windings, means for connecting the base electrodes of said transistors, means for connecting the collector electrodes of said transistors, said means comprising one of said plurality of windings of said first transformer, an input direct-current source, means for connecting the base electrodes of said transistors to the said one of said plurality of windings of said first transformer, said means comprising said direct-current source, means for connecting the base and emitter electrodes of each of said transistors, said means comprising an individual one of said plurality of windings of said second transformer, a load, means for serially connecting another of said plurality of windings of said first transformer, said load and another of said plurality of windings of said second transformer, voltage feedback means, said voltage feedback means connecting a portion of said other winding of said first transformer to said load, frequency control means including an equivalent inductance, means for connecting said frequency control means across the said other winding of said second transformer.

12. A converter circuit in accordance with claim 11 wherein said voltage feedback means comprises a resistor.

13. A converter circuit in accordance with claim 11 wherein said voltage feedback means comprises a resonant circuit.

14. A converter circuit having a pair of transistors each having base, collector and emitter electrodes, first and second transformers each having a plurality of windings, means for connecting the collector electrodes of said transistors, means for connecting the emitter electrodes of said transistors, said means comprising one of said plurality of windings of said first transformer, an input direct-current source, means for connecting the collector electrodes of said transistors to the one of said plurality of windings of said first transformer, said means comprising said direct-current source, means for connecting the base and emitter electrodes of said transistors, said means comprising an individual one of said pluralty of windings of said second transformer and a separate portion of the said one of the said windings of said first transformer, a load, means for serially connecting another of said plurality of windings of said first transformer, said load, and another of said plurality of windings of said second transformer, voltage feedback means, said voltage feedback means connecting a portion of said other winding of said first transformer to said load, frequency control means including an equivalent inductance, means for connecting said frequency control means across the said other winding of said second transformer.

15. A converter circuit in accordance wtih claim 14 wherein said voltage feedback means comprises a resistor.

16. A converter circuit in accordance with claim 14 wherein said voltage feedback means comprises a resonant circuit.

17. A converter circuit comprising first and second transistors, each having base, collector and emitter electrodes, a first transformer having first and second windings, a second transformer having first, second and third windings, means for connecting the emitter electrodes of said transistors, means for connecting the collector electrodes of said transistors, said means comprising said first winding of said first transformer, an input direct-current source, means for connecting the emitter electrodes of said transistors to the said first winding of said first transformer, said means comprising said direct-current input source, first, second and third resistors, means for serially connecting the base and emitter electrodes of said first transistor, said means comprising and first resistor and said first winding of said second transformer, means for serially connecting the base and emitter electrodes of said second transistor, said means comprising said second resistor and said second winding of said second transformer, means for connecting said direct-current input source to the base electrode of said first transistor, said means comprising said third resistor, a load, means for serially connecting said second winding of said first transformer, said load and said third winding of said second transformer, voltage feedback means comprising an impeance, said voltage feedback means connecting a portion of said second winding of said first transformer to said load, frequency control means comprising a serially connected resistor and inductor, means for connecting said frequency control means across said third winding of said second transformer.

18. A converter circuit in accordance with claim 17 wherein said voltage feedback means comprses a resistor.

19. A converter circuit in accordance with claim 17 wherein said voltage feedback means comprises a series resonant inductor and capacitor.

20. A converter circuit having first and second transistors each having base, collector and emitter electrodes, a first transformer having first and second windings, a second transformer having first, second and third windings, means for connecting the base electrodes of said transistors, means for connecting the collector electrodes of said transistors, said means comprising said first winding of said first transformer, an input direct-current source, means for connecting the base electrodes of said transistors to the said first winding of said first transformer, said means comprising said direct-current source, first, second and third resistors, means for serially connecting the base and emitter electrodes of said first transistor, said means comprising said first resistor and said first winding of said second transformer, means for serially connecting the base and emitter electrodes of said second transistor, said means comprising said second resistor and said second winding of said second transformer, means for connecting said input direct-current source to the base electrode of said first transistor, said means comprising said third resistor, a load, means for serially connecting said second winding of said first transistor, said load and said third winding of said second transformer, voltage feedback means comprising an impedance, said voltage feedback means connecting a portion of said second winding of said first transformer to said load, frequency control means comprising a serially connected inductor and resistor, means for connecting said frequency control means across the said third winding of said second transformer.

21. A converter circuit in accordance with claim 20 wherein said voltage feedback means comprises a resistor.

22. A converter circuit in accordance with claim 20 wherein said voltage feedback means comprises a series resonant inductor and capacitor.

23. A converter circuit having first and second transistors, each having base, collector and emitter electrodes, a first transformer having a first and a second winding, a second transformer having a first, second and third winding, means for connecting the collector electrodes of said transistors, means for connecting the emitter electrodes of said transistors, said means comprising said first winding of said first transformer, an input direct-current source, means for connecting the collector electrodes of said transistors to the said first winding of said first transformer, said means comprising a direct-current source, first, second and third resistors, means for serially connecting the base and emitter electrodes of said first transistor, said means comprising said first resistor, said first winding of said second transformer and a first portion of said first winding of said first transformer, means for serially connecting the base and emitter electrodes of said second transistor, said means comprising said second resistor, said second winding of said second transformer and a second portion of said first winding of said first transformer, means for connecting the base and collector electrodes of said first transistor, said means comprising said third resistor, a load, means for serially connecting said second winding of said first transformer, said load and said third windings of said second transformer, voltage feedback means comprising an impedance, said voltage feedback means connecting a portion of said second windings of said first transformer to said load, frequency control means comprising a serially connected resistor and inductor, means for connecting said frequency control means across the said third winding of said second transformer.

24. A converter circuit in accordance with claim 23 wherein said voltage feedback means comprises a resistor.

25. A converter circuit in accordance with claim 23 wherein said voltage feedback means comprises a series resonant inductor and capacitor.

26. In a power supply system, first, second, third and fourth transistors each having a base, emitter and collector electrodes, first and second transformers each having a plurality of windings, a bridge circuit having four arms forming a pair of input and a pair of output vertices, one of said transistors in each arm of said bridge, means for connecting the emitter electrodes of said first and fourth transistors to one of said input vertices, means for connecting the collector electrodes of said second and third transistors to the other of said input vertices, means for connecting the collector electrode of said first transistor and the emitter electrode of said second transistor to one of said output vertices, means for connecting the emitter electrode of said third transistor and the collector electrode of said fourth transistor to the other of said output vertices, a direct-current supply source, means for connecting said direct-current supply source to said input vertices, means for connecting said output vertices, said means comprising one of said plurality of windings of said first transformer, means for connecting the base-emitter electrodes of each of said transistors, said means comprising an individual one of said plurality of windings of said second transformer, a load, means for serially connecting another of said plurality of windings of said first transformer, said load and another of said plurality of windings of said second transformer, voltage feedback means, said voltage feedback means connecting a portion of said other winding of said first transformer to said load.

27. A power supply system in accordance with claim 26 wherein said voltage feedback means comprises an impedance.

28. A power supply system in accordance with claim 26 wherein said voltage feedback means comprises a resonant circuit.

29. In a power supply system, first, second, third and fourth transistors each having a base, emitter and collector electrodes, first and second transformers each having a plurality of windings, a bridge circuit having four arms forming a pair of input and a pair of output vertices, one of said transistors in each arm of said bridge, means for connecting the emitter electrodes of said first and fourth transistors to one of said input vertices, means for connecting the collector electrodes of said second and third transistors to the other of said input vertices, means for connecting the collector electrode of said first transistor and the emitter electrode of said second transistor to one of said output vertices, means for connecting the emitter electrode of said third transistor and the collector electrode of said fourth transistor to the other of said output vertices, a direct-current supply source, means for connecting said direct-current supply source to said input vertices, means for connecting said output vertices, said means comprising one of said plurality of windings of said first transformer, means for connecting the base-emitter electrodes of each of said transistors, said means comprising an individual one of said plurality of windings of said second transformer, a load, means for serially connecting another of said plurality of windings of said first transformer, said load and another of said plurality of windings of said second transformer, voltage feedback means comprising an impedance, said voltage feedback means connecting a portion of said other winding of said first transformer to said load, frequency control means, means for connecting said frequency control means across the said other winding of said second transformer.

30. A power supply system in accordance with claim 29 wherein said voltage feedback means comprises an impedance.

31. A power supply system in accordance with claim 29 wherein said voltage feedback means comprises a resonant circuit.

32. A power supply system in accordance with claim 29 wherein said frequency control means comprises an equivalent inductance.

33. In a power supply system, first, second, third and fourth transistors, each having base, collector and emitter electrodes, a first transformer having first and second windings, a second transformer having first, second, third, fourth and fifth windings, a bridge circuit having four arms forming a pair of input and a pair of output vertices, one of said transistors in each arm of said bridge, means for connecting the emitter electrodes of said first and fourth transistors to one of said input vertices, means for connecting the collector electrodes of said second and third transistors to the other of said input vertices, means for connecting the collector electrode of said first transistor and the emitter electrode of said second transistor to one of said output vertices, means for connecting the emitter electrode of said third transistor and the collector electrode of said fourth transistor to the other of said output vertices, an inductor, an asymmetrically conducting device, a direct-current supply source, a capacitor, means for serially connecting one of said input vertices, said direct-current supply source, said inductor and the other of said input vertices, means for connecting said asymmetrically conducting device across said inductor, means for connecting said input vertices, said means comprising said capacitor, means for connecting said output vertices, said means comprising said first winding of said first transformer, first, second, third, fourth, fifth and sixth resistors, means for connecting the base and emitter electrodes of said first transistor, said means comprising said first resistor and said first winding of said second transformer, means for serially connecting the base and emitter electrodes of said second transistor, said means comprising said second resistor and said second winding of said second transformer, means for serially connecting the base and emitter electrodes of said third transistor, said means comprising said third resistor and said third winding of said second transformer, means for serially connecting the base and emitter electrodes of said fourth transistor, said means comprising said fourth resistor and said fourth winding of said second transformer, means for connecting the base electrode of said second transistor to the collector electrode of said third transistor, said means comprising said fifth resistor, means for connecting the base electrode of said fourth transistor to the collector electrode of said third transistor, said means comprising said sixth resistor, a load, means for serially connecting said second winding of said first transformer, said load and said fifth winding of said second transformer, voltage feedback means, said voltage feedback means connecting a portion of said second winding of said first transformer to said load, frequency control means comprising a serially connected adjustable resistor and inductor, and means for connecting said frequency control means across said fifth winding of said second transformer.

34. A power supply system in accordance with claim 33 wherein said voltage feedback means comprises a series resonant inductor and capacitor.

35. In a power supply system in accordance with claim 33 frequency control means, said frequency control means being connected across said fifth winding of said second transformer.

36. In a transistor oscillator, a transistor having input and output circuits, a load, means for serially connecting said output circuit, said input circuit and said load in a load current feedback path, and means for connecting said load across at least a portion of both said input and said output circuits in a voltage feedback path, whereby voltage and current feedback energy is transmitted from said load to said transistor.

References Cited in the file of this patent

FOREIGN PATENTS 105,950 Australia ---------------- Nov. 24, 1937

OTHER REFERENCES

Jensen: IRE Transactions on Circuit Theory, September 1957, page 276.

Fleming: Electronic Engineering, September 1959, page 543.